April 7, 1959  G. NEESE  2,881,036
ROLLER BEARING CAGE
Filed Dec. 8, 1953
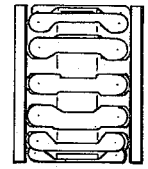
Fig. 1
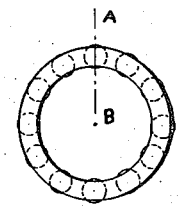
Fig. 2
Fig. 3
Fig. 4
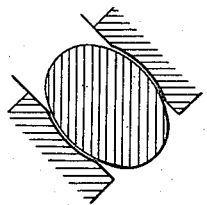
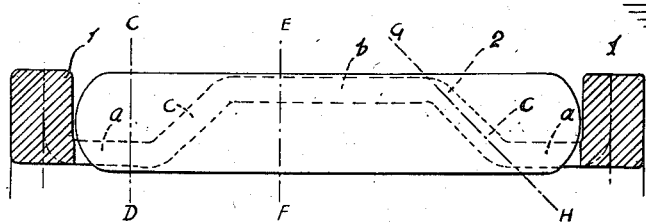
Fig. 5  Fig. 6
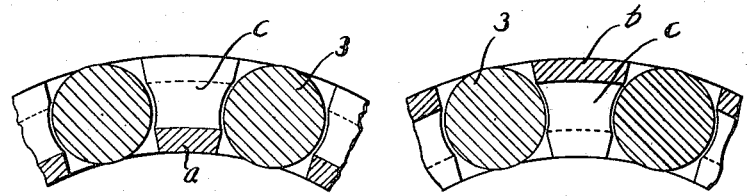
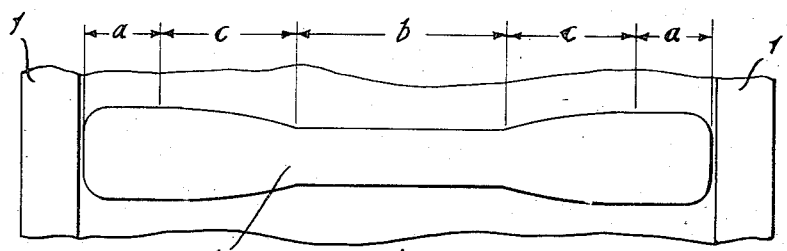
Fig. 7
INVENTOR
GERHARD NEESE
By Shoemaker & Mattare
ATTORNEYS

United States Patent Office 2,881,036
Patented Apr. 7, 1959

2,881,036

ROLLER BEARING CAGE

Gerhard Neese, Bielefeld, Germany, assignor to Durkopp-werke Aktiengesellschaft, Bielefeld, Germany, a corporation of Germany Application December 8, 1953, Serial No. 396,996

2 Claims. (Cl. 308—217)

This invention relates to the forming and manufacture of bearing cages for cylindrical bearings in particular for roller bearings, including needle bearings, in which the rollers or needles are held individually in cage pockets and are guided concentrically of the bearing. The main object of the invention is to provide a light, cheap cage of simple manufacture which is particularly suitable for bearings having high rotational speeds, which may be manufactured from sheet, tubular or solid material, and which is advantageously fitted where there is only limited bearing space.

Roller bearing cages made of annular sheet metal, and of U-shaped cross section are known, which cages guide the roller members concentrically in stamped-out cage pockets and also hold them radially. The holding of the roller members is effected by means of lugs formed on the cross parts bounding the cage pockets which lugs embrace, in a locking manner, the roller members at their outer surfaces. Furthermore roller bearing cages are known in which the roller members are guided concentrically in the cage pockets by means of bent or undulating cross pieces. As a roller-holding means with this latter arrangement, holding pins are provided on the lateral rings of the cage which holding pins engage axial borings of the rollers. Such cages may however only be used for comparatively thick roller or cylinder bearings but cannot on the other hand be used for needle bearings of the usual sizes.

Various constructions of cage have been known for the concentric guiding and holding of thin needle bearings. In a known construction the needle bearings are held by means of nose-like projections pressed out of the guiding cross pieces at certain points of their periphery whilst in another known construction the holding of the needle bearings is effected by means of embracing their cone-tapered ends. The known roller cages are not suitable for thin needle bearings whilst the known needle bearing cages have certain drawbacks the removal of which the invention has as its object.

The improved cage according to this invention, suitable in particular for needle bearings, consists of an annular metal member or body of U-shaped cross section with stamped out cage pockets in which the rollers are individually guided and are also held at the cover and base sides, the pocket sections stamped out in the cross piece of this U-shaped cage ring being divided into several sections of different width and shape and in fact into two end sections and a middle section as roller-retaining, holding zones, both with axial and parallel bounding edges, and two intermediate sections connecting the respective end sections with the middle section, as roller-guiding zones with curve-shaped bent bounding edges to follow the curvature of the rollers in close proximity to them. The cross pieces or the middle sections of same, located between the pocket sections, are bent towards the outer side of the cage over the arc of the roller, in such a manner that the said middle sections of the cross pieces secure the rollers against falling out, the rollers having been inserted into the pockets from the outer side whilst the two end sections of the cross pieces acting as retaining means for the rollers guide the rollers concentrically.

Compared with the known needle bearing cages made of sheet metal, tubular or solid material the subject matter of the present invention has functional and technical advantages. The comparatively thin wall of the cage in the area of the cross pieces permits of the location of a larger number of roller members than is possible with a thick-walled cage whose roller pockets are produced by means of stamping. In the known construction of needle cage with holding lugs pressed out of the cross pieces, the wall thickness can only be selected so as to be slightly thinner than the roller diameter, as the holding lugs provided at the inner and outer side must embrace the rollers above and below the circle. Moreover the small lugs easily break off in the use of the bearing, and cause jamming. A further advantage of the present invention is obtained by the curved intermediate guiding surfaces which impart a particularly good concentric guiding of the roller members with only slight acceleration resistance. Thus the cage is also suitable for higher rotational speeds in which the danger of excessive heat formation is normally particularly great.

The manufacture of the cage according to the invention is obviously simple. As a blank material an annular casing made of sheet metal or a tube is used in which the cage pockets are stamped out after turning up of the edges of the lateral rings and from which then the cage is formed by radial and axial forming of the cross piece parts lying between the pockets. If for any constructional reasons the lateral rings of the cage are to be made with a greater wall thickness than the cross piece part then a turned part can be used which consists of a thin-walled cross piece part with annular flanges of desired wall thickness at both ends. The further working in this case is the same as with the use of a sheet metal casing or tubular casing.

A representative example of the invention is illustrated in the accompany drawing, wherein:

Fig. 1 shows the improved roller cage in front elevation; and

Fig. 2 is a side elevation of the same;

Fig. 3 is a section on a larger scale taken on line A—B in Fig. 2;

Fig. 4 is a section on the line G—H of Fig. 3;

Fig. 5 is a transverse section on the line C—D of Fig. 3; and

Fig. 6 is a similar section on line E—F of Fig. 3;

Fig. 7 shows a roller pocket in the cage before the formation of the cross piece part.

The cage consists of a sheet metal or turned member of U-shaped cross section the side flanges 1 of which are joined one to the other by means of cross pieces 2 uniformly distributed around the periphery, which cross-pieces each have two lateral sections $a$, a widened middle section $b$ and two intermediate or connecting sections $c$. The wider middle sections $b$ of the cross pieces 2 are displaced outwardly and their inner edges form the outer holding zones for the roller members 3, whilst the inner holding zones for the rollers are formed by the inner edges of the lateral sections $a$, as shown in Figures 5 and 6. The desired centering of the roller members 3 with respect to their housings is effected by contact with the shaped edges of the said oblique connecting sections $c$.

In the manufacture of the improved cage, a cylindrical casing is first formed, preferably by drawing a flat sheet metal plate, the bottom and the holding edge resulting from the drawing operation then being removed to provide a cylinder with two open ends. The ends of the casing are now bent over outwards and form the lateral rings or flanges 1 of the cage. The cross pieces lying between the lateral rings 1 of the cage are formed by stamping out the pockets 4 in the form illustrated in Fig. 7.

The cross piece parts 2 remaining between the individual roller pockets 4 have as holding zones for the roller members 3 at both ends, the narrow sections $a$ with parallel edges and a wider middle section $b$ likewise with parallel edges. The trapezoidal cross piece sections $c$ located between the sections $a$ and $b$ have, corresponding to the development of the outer roller member, curve shaped bent edges. That is to say, the edges of the intermediate portions $c$ lie in a surface of revolution only slightly greater in diameter than the cylindrical surface of the rollers.

After stamping out of the cage pockets 4 the middle section $b$ of the cross piece parts 2 is bent outwards, whereby the lateral rings 1 are drawn nearer to one another. The cross piece width or the distance of the cross piece edges lying opposite one another is so selected that the roller members 3 after completion of the cage can be sprung in from outside but after being sprung in are secured against falling out.

In a cage made from a sheet of metal or tube the annular rings 1 have the same wall thickness as the cage cross pieces 2. In many cases however it may be desired to give the annular rings 1 a thicker wall which is, for example, obtained by using a turned part as a blank which consists of a cylindrical thin-walled cross piece part with annular flanges of desired thickness provided at the two ends.

What I claim is:

1. A roller bearing cage for needle roller bearings which comprises a tubular metal element having flanged ends and slotted longitudinally to provide a plurality of substantially identical spaced parallel cross pieces distributed circumferentially thereof, each of said cross pieces including lateral portions, a middle portion and connecting portions between said lateral portions and said middle portion, said lateral portions and said middle portion of each pair of said cross pieces being radially spaced to define corresponding inner and outer holding elements between which a corresponding roller of said needle roller bearing is retained, said connecting portions of each pair of consecutive cross pieces each having side edges longitudinally curved substantially according to the development of the cylindrical surface of said corresponding roller of said needle roller bearing whereby said edges afford continuous concentric guiding and centering of said corresponding roller and hold the roller against shifting of the axis thereof radially, while any thrust occurring during said continuous guiding and centering is continuously distributed over longitudinally spaced varying portions of the surface of said corresponding roller.

2. A roller bearing cage constructed according to claim 1 and wherein said lateral portions and said middle portion of each pair of consecutive cross pieces are substantially parallel to the cylindrical surface of said corresponding roller of said needle roller bearing, and said connecting portions of each pair of said cross pieces are obliquely directed between said lateral portions and said middle portion whereby said longitudinally curved edges of said connecting portions substantially continuously embrace the adjacent portion of the cylindrical surface of said corresponding roller between said inner holding element and said outer holding element and spaced from the ends of said corresponding roller to thereby permit high rotational speed of said corresponding roller and distribute any thrust resulting from friction occurring during said continuous guiding and centering of said roller along the cylindrical surface of said roller while thrust resulting from friction occurring during longitudinal displacement of said corresponding of said needle roller bearings is distributed at the end surfaces of said corresponding roller.

References Cited in the file of this patent

UNITED STATES PATENTS

| | | |
|---|---|---|
| 1,668,112 | Gibbons | May 1, 1928 |
| 1,764,198 | Carlson | June 17, 1930 |
| 1,951,042 | Walter | Mar. 13, 1934 |
| 1,963,407 | Herrmann | June 19, 1934 |
| 2,327,237 | Baden | Aug. 17, 1943 |
| 2,342,340 | Hickling | Feb. 22, 1944 |
| 2,356,298 | Banker | Aug. 22, 1944 |
| 2,409,236 | Banker | Oct. 15, 1946 |